United States Patent [19]
Kobayashi

[11] Patent Number: 5,677,088
[45] Date of Patent: Oct. 14, 1997

[54] NICKEL ELECTRODE PLATE FOR AN ALKALINE STORAGE BATTERY

[75] Inventor: Tatsuo Kobayashi, Tochigi-ken, Japan

[73] Assignee: Bridgestone Metalpha Corporation, Tokyo, Japan

[21] Appl. No.: 565,430

[22] Filed: Nov. 30, 1995

[30] Foreign Application Priority Data

Dec. 8, 1994 [JP] Japan ................ 6-331288

[51] Int. Cl.⁶ .................................. H01M 4/64
[52] U.S. Cl. .......................... 429/235; 429/245
[58] Field of Search .................. 424/142, 145, 424/147, 218, 233, 235, 237, 241, 244, 245

[56] References Cited

U.S. PATENT DOCUMENTS 4,623,600 11/1986 Fritts et al. ............... 429/223
5,432,031 7/1995 Teraoka et al. ............ 429/223
5,487,961 1/1996 Strangways et al. ....... 429/223

FOREIGN PATENT DOCUMENTS 2-216766 8/1990 Japan.

*Primary Examiner*—M. Nuzzolillo
*Attorney, Agent, or Firm*—Jordan and Hamburg

[57] ABSTRACT

An improved nickel electrode plate for an alkaline storage battery in which a paste-like active material is filled. The plate has a porous structure comprising one non-woven fabric or two or more such fabrics made of metal fibers each having a diameter of 10 μm or more and a length of at least 10 mm and a framework made of nickel wires each thicker than the metal fiber to support the non-woven fabric or fabrics. The metal-fiber non-woven fabric or fabrics and nickel wires are sintered together to form the porous structure.

8 Claims, 6 Drawing Sheets

NICKEL ELECTRODE PLATE FOR AN ALKALINE STORAGE BATTERY

BACKGROUND OF THE INVENTION

The present invention relates to an improved and novel plate for use as a nickel electrode for an alkaline storage battery.

Many types of nickel electrode plates have been proposed for use in an alkaline storage battery. They include a sintered plate made of a punched steel sheet, expanded metal, a wire net or the like on which a nickel powder is sintered, a plate made of an open-battery resin-foam framework having good electroconductivity and being metallized, a plate made of nickel-plated metal fibers or nickel fibers, etc. For use in an alkaline storage battery, the plate is filled with an energy-storing or active material. For an increased energy density, the plate should have a correspondingly high porosity. An example of this type of plate is a metallic porous structure made of three-dimensionally entangled metal fibers and in which an active material is filled. In such a plate structure, the diameter of each fiber is 20 to 150 µm, the porosity thereof is 90 to 97% and the density per plate surface area is 20 to 70 mg/cm$^2$. This plate is used as a positive electrode while a metal hydride or other hydride capable of occluding and releasing hydrogen electrochemically is used as a negative electrode. The positive and negative electrodes are immersed in an alkaline electrolyte in a container to form a nickel-hydrogen alkaline storage battery. The metallic porous structure is made by cutting a nickel ingot using, for example, the chatter-vibration cutting technique to make short nickel fibers, forming the short fibers into a kind of non-woven fabric, and sintering the non-woven fabric in a hydrogen gas atmosphere to keep the strength of the non-woven fabric. The metallic porous structure thus formed is filled with paste-like mixture as an active material, and then dried under pressure. One of such well-known active materials is composed of 90% by weight Ni(OH)$_2$, 6% by weight Co powder and 4% by weight Ni powder.

Since the porosity of the plate made of metal fibers can be increased, its energy density can be increased. Generally, however, since the plate rigidity is low, it is difficult to fill it deeply with a paste-like active material whose base is nickel hydroxide.

Also, since the plate made of such metal-fiber structure has a low electroconductivity through the contacts between the sintered fibers, the electric current collection from the active material cannot be efficient.

SUMMARY OF THE PRESENT INVENTION

The present invention has an object to overcome the above-mentioned drawbacks of the prior art by providing an improved plate made of metal fibers.

The above object is accomplished by providing a nickel electrode plate for an alkaline storage battery, in which a paste-like active material is filled. The electrode plate has a porous structure comprising: one non-woven fabric or two or more such fabrics made of metal fibers each having a diameter of 10 µm or more; and a length of at least 10 mm, and a framework made of nickel wires each thicker than the metal fiber to support the non-woven fabric or fabrics, the metal-fiber non-woven fabric or fabrics and nickel wires being sintered together to form the porous structure.

The metal fibers should preferably be nickel-plated ones or nickel fibers. On the other hand, the nickel wires should preferably be continuously extended to form the framework to support the porous structure or continuously shaped longitudinally into a waved or spiral form as the case may be. Of course, the nickel wires should preferably be oriented in the direction of current collecting leads which would be in an alkaline storage battery.

The plate of an alkaline storage battery is an electroconductive core in which a paste-like active material, whose base is nickel hydroxide, is filled. It should have a high electroconductivity, sufficient mechanical strength and the capability of being deeply filled within an active-material. To meet these requirements, the present invention uses metal fibers with high mechanical strength and a porous structure capable of deeper active-material filling. The porous structure is made by processing metal fibers into a non-woven fabric. For filling the active material deeper in the porous structure, however, the non-woven fabric should preferably be formed by three-dimensionally entangling the metal fibers.

The metal fibers used to make a non-woven fabric structure should be alkali-resistant ones, and preferably be nickel-plated metal fibers. Thus, it is possible to prevent the plate from being degraded in strength and electroconductivity due to corrosion. Of course, the metal fibers should more preferably be of nickel to avoid the above problems. Also, to prevent the metal-fiber porous structure from being reduced in porosity when compressed at the time of filling with an active material, each of the alkali-resistant metal fibers has a diameter of 10 µm or more. Also the fiber diameter is 100 µm or less to prevent the porous structure from being increased in weight, the metal fibers from being unevenly distributed and reduction of the fiber surface area to ensure effective utilization of the active material.

Further, the fiber should be 10 mm or more in length. If not, the plate will not be strong enough for the required active-material filling and level of electroconductivity.

The metal fibers are sintered after being formed into a non-woven fabric in order to improve the mechanical properties of the non-woven fabric and the electroconductivity through the contacts between the entangled metal fibers.

Further, nickel wires having a larger diameter than the metal fibers are laid in the non-woven fabric to improve the electroconductivity and mechanical properties. For improved strength and electroconductivity of the plate, the nickel wires are continuously extended longitudinally and/or laterally of the plate.

To improve the porosity of the non-woven fabric structure, the nickel wires should be limited in number and orientation to within a required range.

Moreover, when the nickel wires are shaped to have a waved or spiral form so that the metal fibers are closely entangled with the nickel wires, electroconductivity and mechanical properties such as compression rigidity, etc. are further improved.

These and other objects and advantages of the present invention will be better understood from the ensuing description made, by way of example, of the preferred embodiments of the present invention with reference to the drawings.

DETAILED DESCRIPTION OF THE PREFERRED EMBODIMENTS

Preferred Embodiment 1

A nickel wire 0.30 mm in diameter was continuously shaped longitudinally thereof to be a spiral having a diameter of 1.8 mm and pitch of 7 mm. The spiral nickel wires are arranged at regular intervals of 5 mm in parallel with each other. A non-woven fabric is formed from spiral nickel fibers of 20 μm in diameter. The array of spiral nickel wire is placed between two nickel-fiber non-woven fabrics to reinforce the latter. The spiral wires and nickel-fiber non-woven fabrics thus assembled are sintered in a reduced atmosphere at a temperature of 1,050° C. for 1 hour to produce a plate I having a thickness of 1.8 mm and porosity of 95%.

Figure 1:
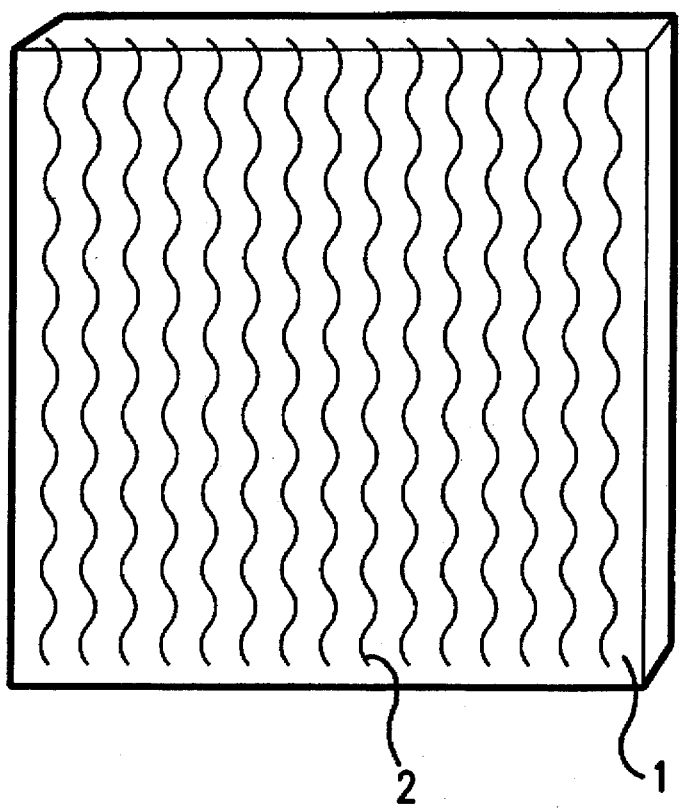
FIG. 1 is a perspective view of a plate according to a first embodiment of the present invention.
Figure 2:
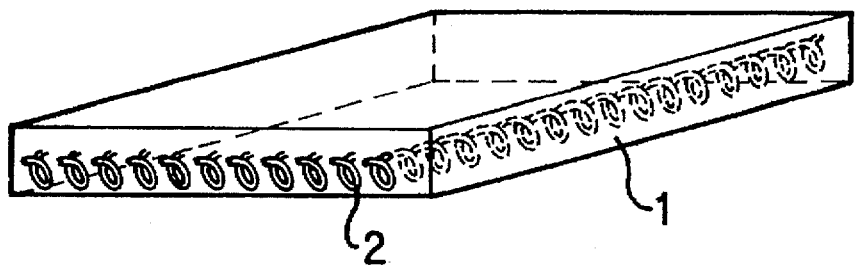
FIG. 2 is a concept drawing showing the spiral nickel wires laid in the plate in FIG. 1.

The plate thus produced is shown in perspective view in FIG. 1 (the embodiment). The spiral nickel wires 2 are specifically shown in FIG. 2 with the nickel-fiber non-woven fabric 1.

Comparative Example

A non-woven fabric made of nickel fibers having a diameter of 20 μm was sintered under the same conditions as above to produce a plate II having a thickness of 1.8 mm and porosity of 95%.

Evaluation

The plates I and II thus produced were tested to evaluate the compression rigidity and electroconductivity thereof. The measured compression rigidity of the plate I was 697 g/mm, and that of plate II was 492 g/mm. The measured electrical resistivity of the plate I was $5.17 \times 10^{-4}$ Ω·cm while that of the plate II was $16.16 \times 10^{-4}$ Ω·cm.

The results reveal that the plate I is greater in compression rigidity than the plate II and lower in electrical resistivity, which means that the plate I has an improved electrical collection or electroconductivity.

For the evaluation of the compression rigidity, a sample of 90 mm in length, 90 mm in width and 1.8 mm in thickness was prepared from each of the plates I and II. Each sample was placed on a flat rigid surface and pressed from above by a rigidity measuring jig to record a load-deformation curve. The rigidity measuring jig was a cylinder having a sectional area of 1 cm². The sample was pressed under the circular bottom of this jig at a rate of 2 mm/min. Deformations $\delta_1$ and $\delta_2$ (in mm) of each sample when 50 gf and 500 gf were loaded to the sample, respectively, were determined from the load-deformation curve. For each sample, the compression rigidity was calculated from an expression $(500-50)/(\delta_2-\delta_1)$. Thereafter, such measurement was done at another portion of the same sample in the same manner. The measurement was repeated at 5 portions or so on each sample. A mean value was calculated from the measured values.

For evaluation of the electrical resistivity, a sample of 80 mm in length, 20 mm in width and 1.8 mm in thickness was prepared from each of the plates I and II. Each sample was laterally pinched at either longitudinal end portion thereof by an alligator clip-like terminal. The terminal was so shaped as to have a length extending from one lateral end to the opposite end of the sample and to provide a face contact between the terminal and sample on either side of the sample. Furthermore, the terminal was surface-treated by gold plating or likewise so that the electrical resistance of the contact surfaces thereof is sufficiently low. A constant-current generator was used to supply a predetermined current (1 mA) through the terminal. The voltage from the current supplied to the sample was measured and an electrical resistance of the sample was determined by dividing the measured voltage by the supplied current. The electrical resistivity was calculated from an expression of $e/i \times$ (sectional area/length)×(1−porosity/1000) where i is the current and e is a voltage drop when the current was supplied.

Figure 3:
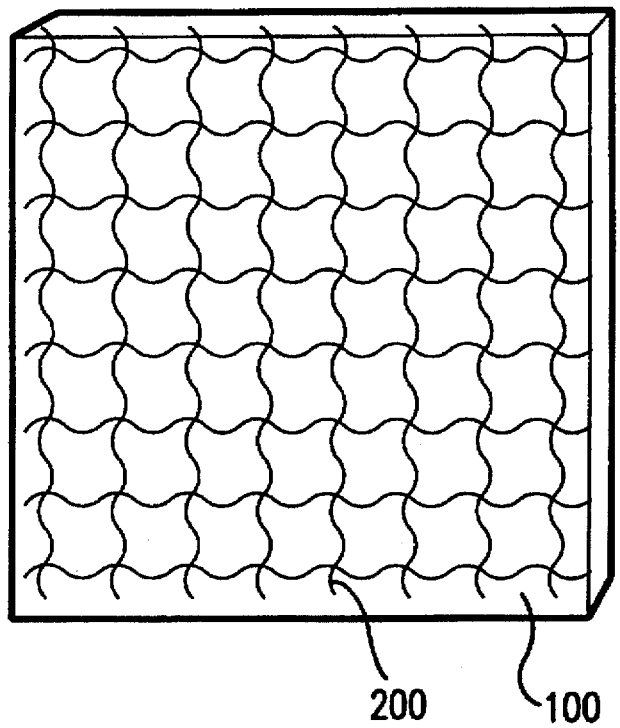
FIG. 3 is a perspective view of a plate according to a second embodiment of the present invention.
Figure 4:
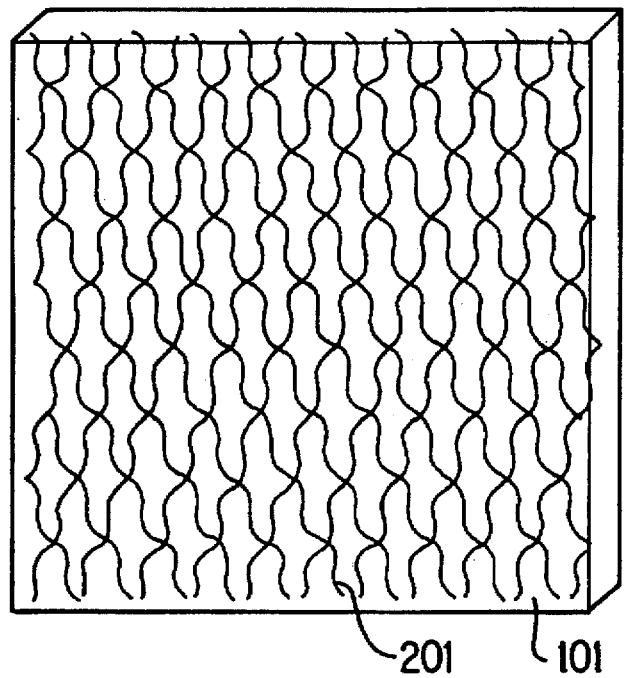
FIG. 4 is a perspective view of a plate according to a third embodiment of the present invention.
Figure 5:
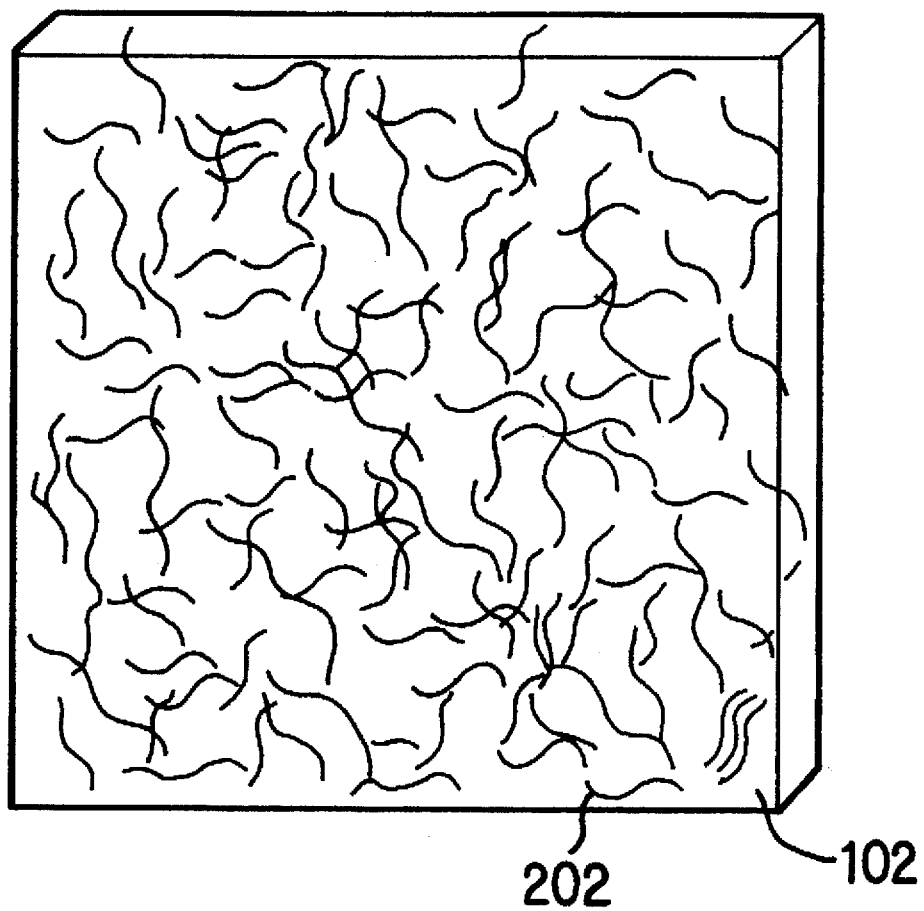
FIG. 5 is a perspective view of a plate according to a fourth embodiment of the present invention.

FIGS. 3 to 5 show the second to fourth embodiments of the plate according to the present invention, in which spiral nickel wires are laid in different directions. FIG. 3 shows the second embodiment in which the spiral nickel wires 200 are laid as perpendicularly intersecting each other. FIG. 4 shows the third embodiment in which the spiral nickel wires 201 are laid as obliquely intersecting each other. FIG. 5 shows the fourth embodiment in which short spiral nickel wires 202 are laid at random in the nickel-fiber non-woven fabric 102. In all these embodiments, the assembly of the nickel-fiber non-woven fabrics and spiral nickel wires was sintered as in the first embodiment.

Figure 6:
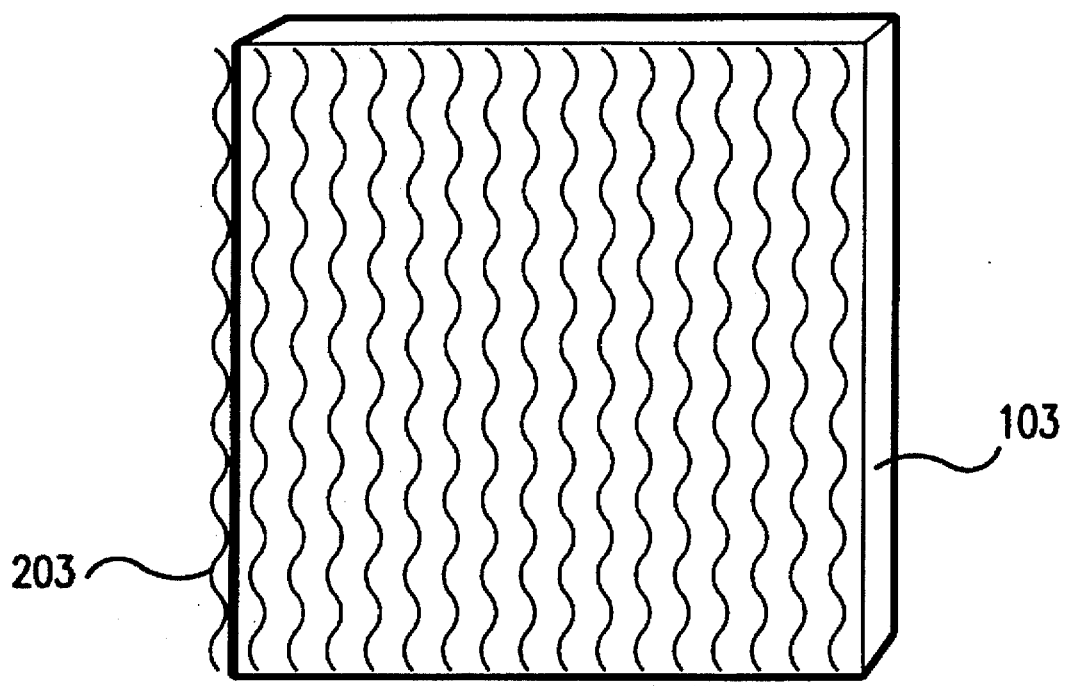
FIG. 6 is a perspective view of a plate according to a fifth embodiment of the present invention.
Figure 7:
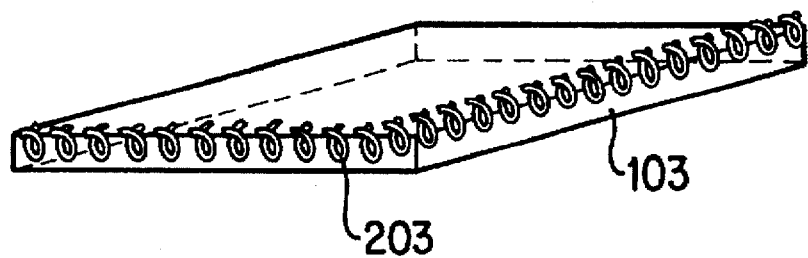
FIG. 7 is a concept drawing showing the spiral nickel wires laid in the plate in FIG. 6.

According to the fifth embodiment of the present invention shown in FIG. 6, a nickel wire 203 of 0.30 mm in diameter was continuously shaped longitudinally thereof to be a spiral having a diameter of 1.8 mm and pitch of 7 mm. Such spiral nickel wires 203 were disposed at regular intervals of 5 mm in parallel with each other to make an array. On the other hand, a non-woven fabric 103 having a thickness of 2 mm was formed from spiral nickel fibers of 20 μm in diameter. One such non-woven fabric 103 was superposed on the spiral nickel wire array, and they were pressed together to have a total thickness of 1.8 mm. The spiral nickel wires 203 were thus embedded in the non-woven fabric 103. They were sintered in a reduced atmosphere at a temperature of 1,050° C. for 1 hour to produce a plate. The spiral nickel wires 203 embedded in the non-woven fabric 103 form together a framework to support the non-woven nickel fabric 103. FIG. 7 shows the concept of the spiral nickel wires 203 laid in the plate.

Figure 8:
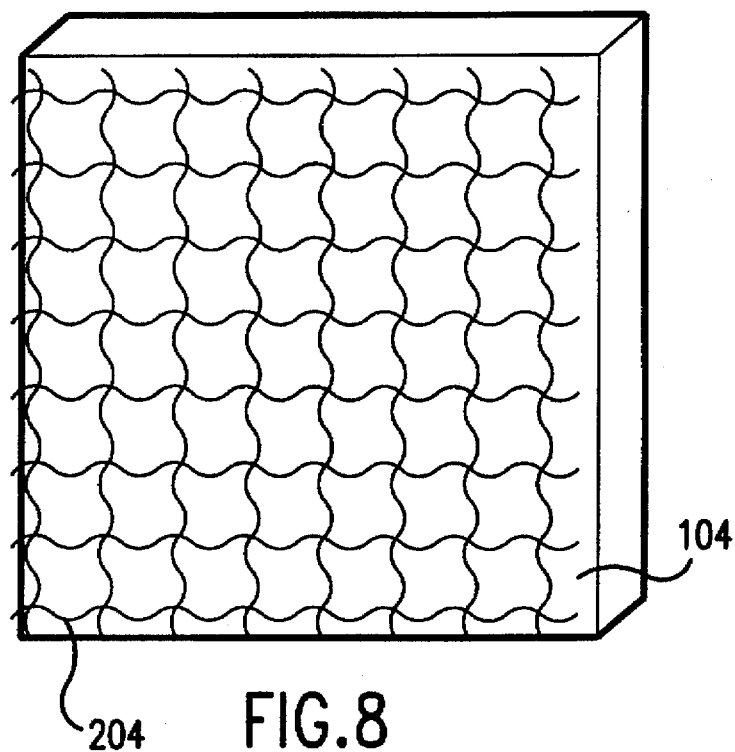
FIG. 8 is a perspective view of a plate according to a sixth embodiment of the present invention.
Figure 9:
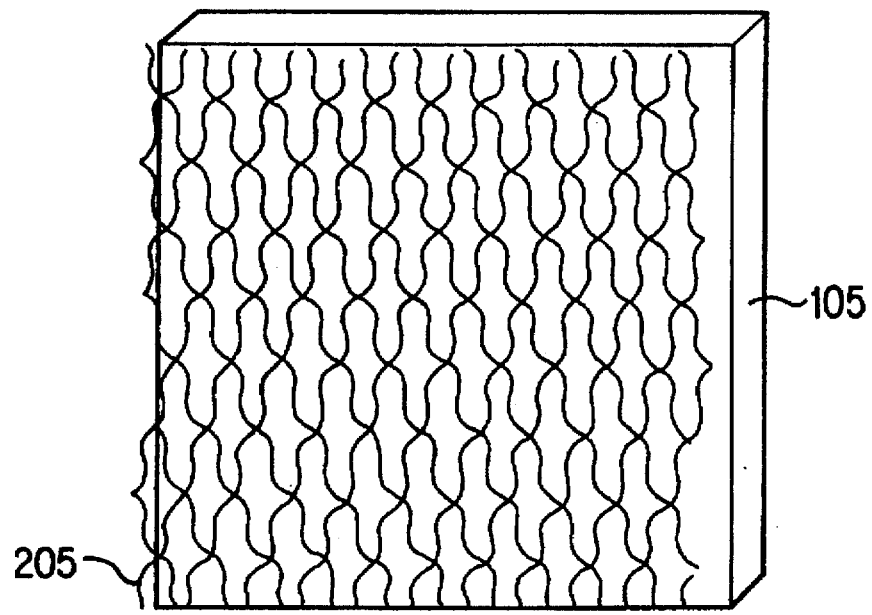
FIG. 9 is a perspective view of a plate according to a seventh embodiment of the present invention.
Figure 10:
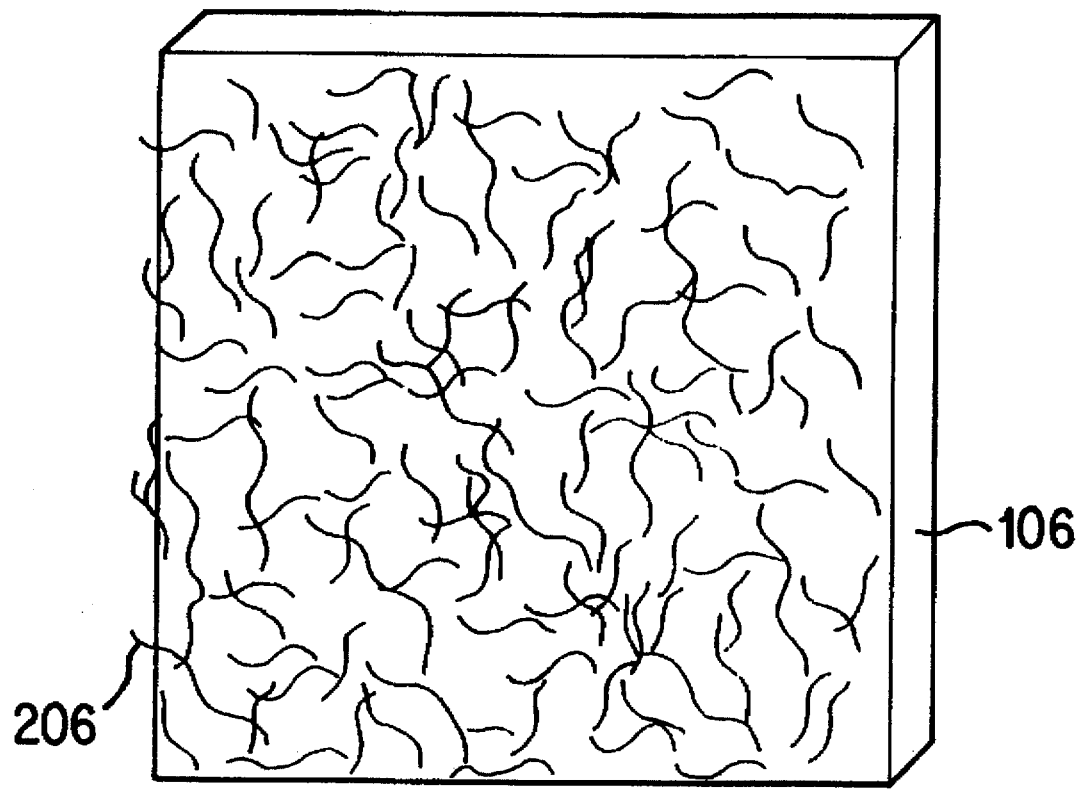
FIG. 10 is a perspective view of a plate according to an eighth embodiment of the present invention.

FIGS. 8 to 10 show the sixth to eighth embodiments of the plate according to the present invention, in which spiral nickel wires are laid in different directions. FIG. 8 shows the sixth embodiment in which the spiral nickel wires 204 are laid as perpendicularly intersecting each other. FIG. 9 shows the seventh embodiment in which the spiral nickel wires 205 are laid as obliquely intersecting each other. FIG. 10 shows the eighth embodiment in which short spiral nickel wires 206 are laid at random in one nickel-fiber non-woven fabric 106. In these embodiments show in FIGS. 8 to 10, the spiral nickel wires are embedded in one nickel-fiber non-woven fabric.

It should be noted that a plate in which nickel wires 2, shaped in any form other than the spiral, are laid in nickel-fiber non-woven fabrics 1 is, of course, included in the scope of the present invention. Such non-spiral nickel wires may be laid unidirectionally as shown in FIG. 1 (first embodiment), as perpendicularly intersecting each other as shown in FIG. 3 (second embodiment), as obliquely intersecting each other as shown in FIG. 4 (third embodiment), as short fibers at random as shown in FIG. 5 (fourth embodiment), and so forth.

The positive electrode plate for an alkaline storage battery, according to the present invention, has an improved compression rigidity, deeper active-material filling and reduced electrical resistivity leading to an improved electroconductivity. Therefore, the plate according to the present invention contributes greatly to improving the performance of the alkaline storage battery and, thus, to the field of industry.

What is claimed is:

1. A nickel electrode plate for an alkaline storage battery, in which a paste-like active material is filled, having a porous structure, comprising:

at least one non-woven fabric made of metal fibers each having a diameter of 10 μm–100 μm and a length of a least 10 mm; and a framework made of nickel wires each thicker than each of the metal fibers, the framework of nickel wires being in an inner portion of the at least one non-woven fabric to support the at least one non-woven fabric, the at least one non-woven fabric and the nickel wires being sintered together to form the porous structure.

2. A nickel electrode plate according to claim 1, wherein the metal fibers are nickel-plated.

3. A nickel electrode plate according to claim 1, wherein the metal fibers are nickel fibers.

4. A nickel electrode plate for an alkaline storage battery, in which a paste-like active material is filled, having a porous structure, comprising:

at least one non-woven fabric made of metal fibers each having a diameter of 10 μm or more and a length of a least 10 mm; and a framework made of nickel wires each thicker than each of the metal fibers and the nickel wires being continuously extended to form the framework to support the at least one non-woven fabric, the at least one non-woven fabric and the nickel wires being sintered together to form the porous structure.

5. A nickel electrode plate according to claim 4, wherein the nickel wires are continuously shaped longitudinally thereof into a waved or spiral form.

6. A nickel electrode for an alkaline storage battery, in which a paste-like active material is filled, having a porous structure, comprising:

at least one non-woven fabric made of metal fibers each having a diameter of 10 μm or more and a length of at least 10 mm; and a framework made of nickel wires each thicker than each of the metal fibers to support the at least one non-woven fabric, the nickel wires being oriented in the direction of the current collecting leads of the alkaline storage battery, the non-woven fabric and nickel wires being sintered together to form the porous structure.

7. A nickel electrode plate according to claim 1, wherein the framework of nickel wires is interposed between two non-woven fabrics.

8. A nickel electrode plate according to claim 1, wherein the framework of nickel wires is embedded in the at least one non-woven fabric.

* * * * *